(12) United States Patent
Ling et al.

(10) Patent No.: US 10,142,042 B2
(45) Date of Patent: *Nov. 27, 2018

(54) METHOD AND SYSTEM FOR A DISTRIBUTED RECEIVER

(71) Applicant: Radioxio, LLC, Saint Paul, MN (US)

(72) Inventors: Curtis Ling, Carlsbad, CA (US); Timothy Gallagher, Encinitas, CA (US); Glenn Chang, Carlsbad, CA (US)

(73) Assignee: Radioxio, LLC, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,305

(22) Filed: Dec. 6, 2017

(65) Prior Publication Data

US 2018/0109341 A1    Apr. 19, 2018

Related U.S. Application Data

(63) Continuation of application No. 13/760,253, filed on Feb. 6, 2013, now Pat. No. 9,876,595.

(Continued)

(51) Int. Cl.
| | |
|---|---|
| *H04H 40/90* | (2008.01) |
| *H04N 5/455* | (2006.01) |
| *H04L 27/38* | (2006.01) |
| *H04N 5/44* | (2011.01) |
| *H04N 21/426* | (2011.01) |
| *H04L 25/06* | (2006.01) |
| *H04L 1/00* | (2006.01) |

(52) U.S. Cl.
CPC .......... *H04H 40/90* (2013.01); *H04L 1/0048* (2013.01); *H04L 25/061* (2013.01); *H04L 25/067* (2013.01); *H04L 27/38* (2013.01); *H04N 5/4401* (2013.01); *H04N 5/455* (2013.01); *H04N 21/42607* (2013.01); *H05K 999/99* (2013.01)

(58) Field of Classification Search
CPC ..... H04H 40/90; H04L 1/0048; H04L 25/061; H04L 25/067; H04L 27/38; H04N 5/4401; H04N 5/455; H04N 21/42607
See application file for complete search history.

(56) References Cited

U.S. PATENT DOCUMENTS

| | | |
|---|---|---|
| 6,343,210 B1 | 1/2002 | Emmons, Jr. et al. |
| 6,449,110 B1 | 9/2002 | DeGroat et al. |

(Continued)

OTHER PUBLICATIONS

Int'l Search Report and Written Opinion for PCT/US2013/024869 dated May 28, 2013.

*Primary Examiner* — Janice Tieu
(74) *Attorney, Agent, or Firm* — Sterne, Kessler, Goldstein & Fox PLLC

(57) ABSTRACT

A first semiconductor die may comprise an interface circuit and a demodulation circuit. The interface circuit may be operable to receive an externally generated signal and recover decisions of a symbol de-mapper carried in the externally generated signal. The demodulation circuit may be operable to recover one or more transport streams based on the decisions of the symbol de-mapper. The first semiconductor die may comprise circuitry operable to combine a plurality of signals from a plurality of second semiconductor dice, where each of the plurality of signals comprises decisions of a respective one of a plurality of symbol de-mappers.

20 Claims, 18 Drawing Sheets

Related U.S. Application Data

(60) Provisional application No. 61/595,654, filed on Feb. 6, 2012, provisional application No. 61/667,460, filed on Jul. 3, 2012, provisional application No. 61/702,799, filed on Sep. 19, 2012.

(56) References Cited

U.S. PATENT DOCUMENTS

| | | |
|---|---|---|
| 6,980,602 B1 | 12/2005 | Kleinerman et al. |
| 7,414,560 B2 * | 8/2008 | Chen .................. H04B 15/00 |
| | | 340/539.12 |
| 2002/0114398 A1 | 8/2002 | Lin et al. |
| 2002/0150038 A1 | 10/2002 | Sumasu et al. |
| 2003/0201932 A1 | 10/2003 | Rabinowitz et al. |
| 2005/0058228 A1 | 3/2005 | Birkett |
| 2006/0268961 A1 * | 11/2006 | Prestwich ............ G01C 21/206 |
| | | 375/146 |
| 2007/0195905 A1 | 8/2007 | Schatz |
| 2007/0197166 A1 | 8/2007 | Kawamoto et al. |
| 2007/0291864 A1 | 12/2007 | Ma et al. |
| 2008/0120528 A1 | 5/2008 | Sawada |
| 2008/0240304 A1 * | 10/2008 | Oh ...................... H04L 5/0048 |
| | | 375/341 |
| 2009/0219978 A1 | 9/2009 | Mobin et al. |
| 2010/0067602 A1 | 3/2010 | Noel et al. |
| 2010/0246287 A1 | 9/2010 | Vigoda et al. |
| 2011/0242428 A1 | 10/2011 | Blouin et al. |
| 2011/0249665 A1 | 10/2011 | Seyama et al. |

* cited by examiner ured using a first semiconductor process, and the subsystem 110a

METHOD AND SYSTEM FOR A DISTRIBUTED RECEIVER

PRIORITY CLAIM

This patent application is a continuation of U.S. application Ser. No. 13/760,253 filed Feb. 6, 2013, which claims priority to and claims benefit from: U.S. Provisional Patent Application Ser. No. 61/595,654 filed on Feb. 6, 2012; U.S. Provisional Patent Application Ser. No. 61/667,460 filed on Jul. 3, 2012; and U.S. Provisional Patent Application Ser. No. 61/702,799 filed on Sep. 19, 2012.

Each of the above-identified applications is hereby incorporated herein by reference in its entirety.

FIELD OF THE INVENTION

Certain embodiments of the invention relate to wireless communications. More specifically, certain embodiments of the invention relate to a method and system for a distributed receiver.

BACKGROUND OF THE INVENTION

Conventional receivers are limited in terms of the performance they can hope to achieve due, for example, to size, location, and power consumption limitations. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a distributed receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1A:
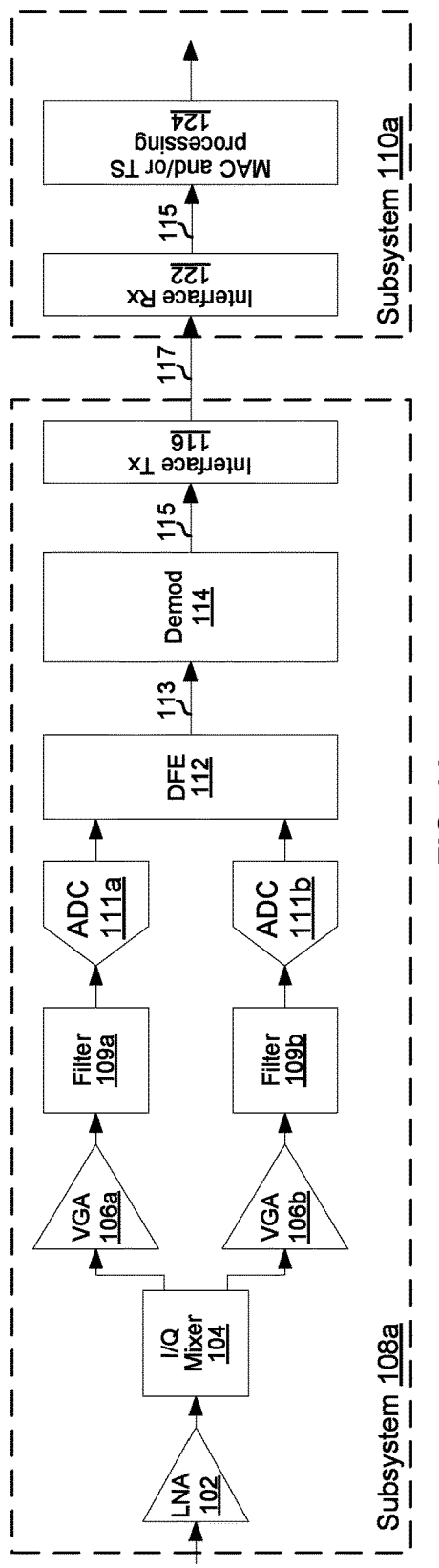
FIG. 1A depicts a first example receiver architecture in which subsystems are partitioned in a first manner.

FIG. 1A depicts a first example receiver architecture in which subsystems are partitioned in a first manner. The receiver in FIG. 1A comprises a first subsystem 108a and a second subsystem 110a. In an example implementation, the subsystem 108a may be a first integrated circuit fabricated using a first semiconductor process, and the subsystem 110a may be a second integrated circuit fabricated using a second semiconductor process. For example, subsystem 108a may be fabricated using an X-nanometer silicon process, and subsystem 110a may be fabricated using a Y-nanometer silicon process, where X and Y are numbers and X is greater than Y.

The example subsystem 108a comprises a low-noise amplifier 102 operable to amplify a received RF signal.

The example subsystem 108a comprises a quadrature mixer 104 operable to generate an in-phase signal and a quadrature phase signal from the received RF signal. Additionally, the mixer 104 may be operable to downconvert the received RF signal. In other example implementations, the mixer 104 may not be a quadrature mixer. In such an implementation, a single signal, rather than I and Q signals, may be output to a single ADC, rather than a pair of ADCs. In other example implementations, the subsystem 108d may comprise an ADC that directly digitizes the received, filtered RF signal.

The example subsystem 108a comprises a pair of filters 109a and 109b operable to filter, respectively, the in-phase and quadrature phase outputs of the mixer 104. Each of the filters 109 may comprise a passband corresponding to a desired frequency band and may provide sufficient attenuation of signals outside the desired band.

The example subsystem 108a comprises a pair of analog-to-digital converters 111a and 111b operable to digitize, respectively, the in-phase and quadrature phase outputs of the filters 111a and 111b.

The example subsystem 108a comprises a digital front end (DFE) 112 operable to combine the in-phase and quadrature-phase digitized spectrums from the ADCs 111a and 111b (including performing filtering, noise cancellation, and/or other operations for improving signal quality).

The example subsystem 108a comprises a demodulator 114. Each of the demodulators may be operable to demodulate a signal in accordance with one or more standards/protocols to recover datastream (e.g., one or more MPEG transport streams) contained in the signal. For example, each of the demodulators may be operable to perform demodulation operations (e.g., timing recovery, equalization, symbol slicing, deinterleaving, FEC decoding, and/or other operations) for signals generated in accordance with one or more standards/protocols. Example protocols/standards include terrestrial television standards/protocols, cable television standards/protocols, and DOCSIS standards/protocols, and Direct Broadcast Satellite (DBS) standards/protocols. Each demodulator $114_n$ may output a respective one of N datastreams recovered from the received spectrum.

The example subsystem 108a comprises an interface transmitter 116 operable to transmit (and process as desired or necessary for the transmission) the signal 115 onto the link 117. The link 117 may be a wireline (e.g., cable or PCB trace), wireless, or fiber optic link. In various example implementations in which signals from multiple subsystems 108 may be communicated to a single subsystem 110, the interface transmitter 116 may perform time-stamping messages sent onto the link 117. The subsystem 110a may use the time-stamps for combining the received data (e.g., to determine which data from a first subsystem 108 corresponds to which data from a second subsystem 108, and so on).

The example subsystem 110a comprises an interface receiver 122 operable to receive the signal(s) over the link 117. In an example implementation, the interface receiver 122 may be operable to perform combining (e.g., maximal ratio combining) and/or MIMO processing as, for example, described below with reference to FIG. 2A.

The example subsystem 110a comprises a media access control (MAC) and/or datastream processing circuit 124 operable to perform OSI layer 2 (media access control) and, optionally, higher OSI layer (e.g., network layer) processing of the datastream 115 (e.g., an MPEG transport stream 115).

Figure 1B:
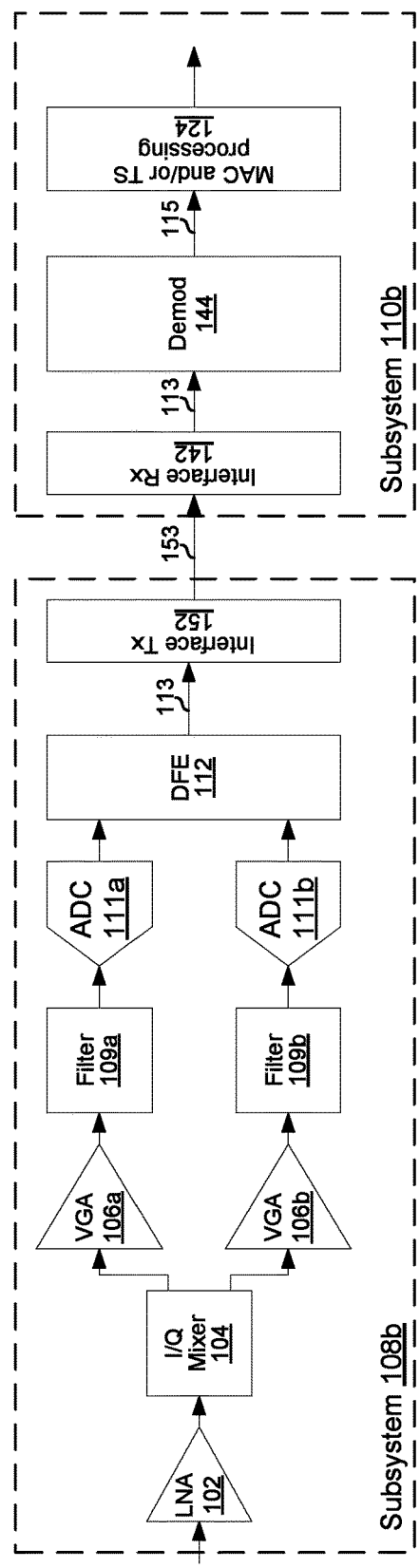
FIG. 1B depicts a second example receiver architecture in which subsystems are partitioned in a second manner.

An advantage of the receiver architecture in FIG. 1A, relative to the architecture of FIG. 1B, is that the link 117 between the subsystems may operate at a lower data rate than the link 153 (e.g., because redundancy and other physical layer overhead has already been removed by the demodulator 114). A disadvantage of the architecture in FIG. 1A, relative to the architecture of FIG. 1B, is that, where the subsystem 108a is implemented in a low-density (e.g., higher feature size) process (e.g., to improve analog performance), the demodulator(s) $114_1$-$114_N$ may require a large amount die area (e.g. to accommodate interleaver memory).

FIG. 1B depicts a second example receiver architecture in which subsystems are partitioned in a second manner. The receiver in FIG. 1B comprises a first subsystem 108b and a second subsystem 110b.

Like the example subsystem 108a in FIG. 1A, the example subsystem 108b comprises the LNA 102, the VGAs 106, the filters 109, the ADCs 111, the DFE 112, and may or may not comprise one or more mixers 104. The example subsystem 108b differs from the example subsystem 108a in that it does not comprise a demodulator and that it comprises a different (or differently configured) interface transmitter 152. The interface transmitter 152 is operable to transmit (and process as necessary or desired for transmission) the signal 113 onto the link 153. The link 153 may be a wireline, wireless, or fiber optic link. In various example implementations in which signals from multiple subsystems 108 may be communicated to a single subsystem 110, the interface transmitter 116 may perform time-stamping messages sent onto the link 117. The subsystem 110a may use the time-stamps for combining the received data (e.g., to determine which data from a first subsystem 108 corresponds to which data from a second subsystem 108, and so on).

Like the example subsystem 110a, the example subsystem 110b comprises the MAC and/or datastream processing circuit 124. The example subsystem 110b differs from the example subsystem 110a in that it comprises the demodulator 144 and a different (or differently-configured) interface receiver 142. The interface receiver 142 may be operable to receive the signal(s) over the link 153 to recover the channel 113. The demodulator 144 may each be operable to perform the same functions as the demodulator 114 described above with reference to FIG. 1A.

An advantage of the architecture of FIG. 1B relative to the architecture in FIG. 1A is that the demodulators may be integrated with digital-only circuitry, which may accommodate use of a higher-density process (e.g., to reduce size of interleaver memory). A disadvantage of the architecture of FIG. 1B relative to the architecture of FIG. 1A is that the link 153 between the two subsystems may need to operate at a higher data rate (e.g. 180 Mbps vs. 40 Mbps) than link 117.

Figure 1C:
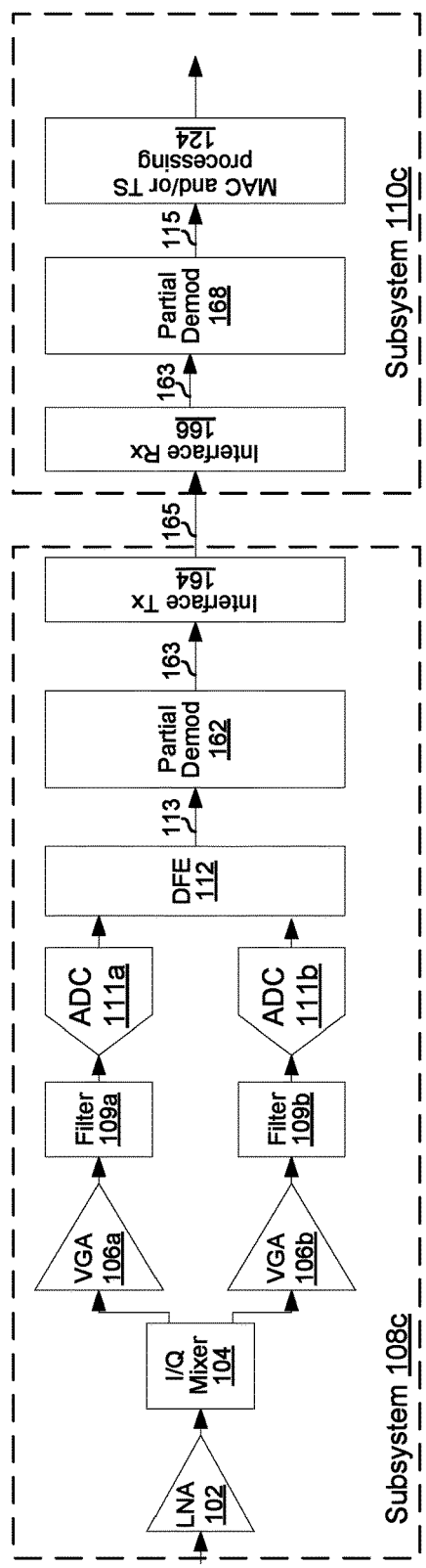
FIG. 1C depicts a third example receiver architecture in which subsystems are partitioned in a third manner.

FIG. 1C depicts a third example receiver architecture in which subsystems are partitioned in a third manner. Like the example subsystem 108a in FIG. 1A, the example subsystem 108b comprises the LNA 102, the VGAs 106, the filters 109, the ADCs 111, the DFE 112, and may or may not comprise one or more mixers 104. The example subsystem 108c differs from the example subsystem 108a in that it includes a partial demodulator 162 and that it comprises a different (or differently configured) interface transmitter 164.

The partial demodulator 162 may be operable to perform a subset of the demodulation operations (e.g., timing recovery, equalization, symbol slicing, etc.) for signals generated in accordance with one or more standards/protocols. Example protocols/standards include terrestrial television standards/protocols, cable television standards/protocols, and DOCSIS standards/protocols, and Direct Broadcast Satellite (DBS) standards/protocols. The partial demodulator 162 may output a signal 163 which may, for example, be hard decision outputs of a symbol de-mapper, soft decision outputs of a symbol de-mapper (e.g., log-likelihood ratios), and/or equalizer settings (e.g., number of taps and/or tap coefficients).

The interface transmitter 164 may be operable to transmit (and processes as necessary or desired for transmission) the signal 163 onto the link 165. The link 164 may be a wireline, wireless, or fiber optic link.

Like the example subsystem 110a, the example subsystem 110c comprises the MAC and/or datastream processing circuit 124. The example subsystem 110c differs from the example subsystem 110a in that it comprises partial demodulator 168 and a different (or differently-configured) interface receiver 166. The interface receiver 166 may be operable to receive the signal(s) over the link 165 to recover the signal 163. The partial demodulator 168 may be operable to perform a subset of the demodulation operations (e.g., FEC decoding) that complement the demodulation operations performed by the partial demodulator 162 (e.g., that complete demodulation of signals generated in accordance with the applicable standards/protocols).

The data rate of the link 165 may be somewhere between the data rate of the link 117 in FIG. 1A and the data rate of the link 153 of FIG. 1B. For example, the link 165 may operate at 54 Mbps, the link 153 may operate at 40 Mbps, and the link 117 may operate at 180 Mbps An advantage of the architecture of FIG. 1C relative to the architecture in FIG. 1A is that most or all of the analog portions of the demodulation operations may be performed in the subsystem 108c that is implemented in the lower-density process and most or all of the digital portions of the demodulation process may be performed in the subsystem 110c that is implemented in higher-density process. Such a partitioning may optimize the cost and size of the overall system comprising subsystems 108c and 110c.

Figure 1D:
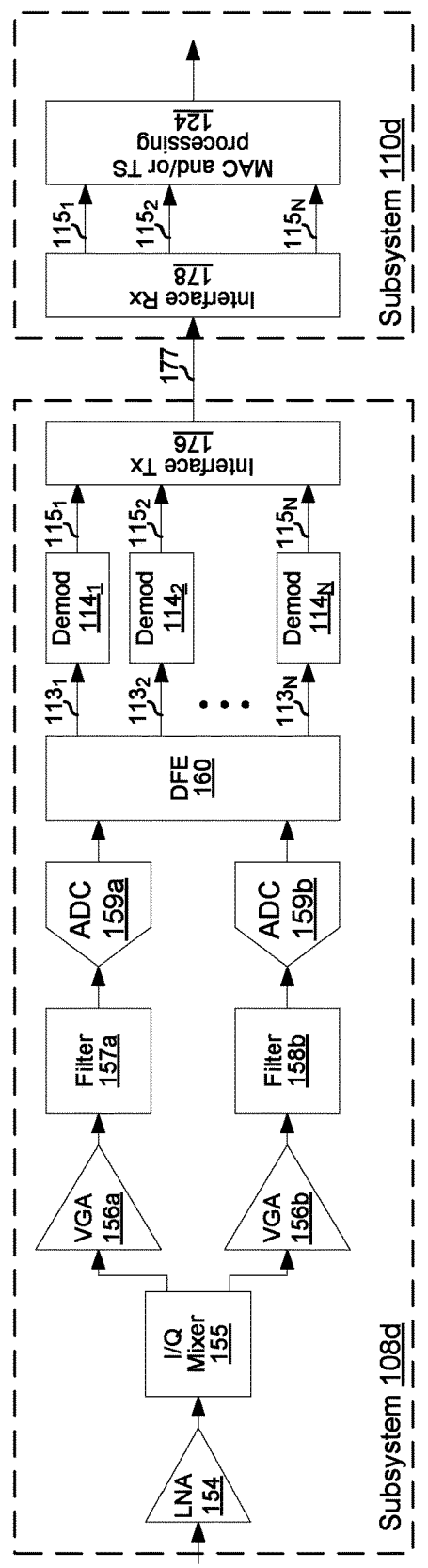
FIG. 1D depicts a first example full-spectrum capture receiver architecture in which subsystems are partitioned in a first manner.

FIG. 1D depicts a first example full-spectrum capture receiver architecture in which subsystems are partitioned in a first manner. The receiver in FIG. 1D comprises a first subsystem 108d and a second subsystem 110d. In an example implementation, the subsystem 108d may be a first integrated circuit fabricated using a first semiconductor process, and the subsystem 110d may be a second integrated circuit fabricated using a second semiconductor process. For example, subsystem 108d may be fabricated using an X-nanometer silicon process, and subsystem 110d may be fabricated using a Y-nanometer silicon process, where X and Y are numbers and X is greater than Y.

The example subsystem 108d comprises a low-noise amplifier 154 operable to amplify a received RF signal. The LNA 154 may be, for example, a wideband amplifier operable to amplify the entire spectrum of a communications protocol/standard of interest. For example, the LNA 154 may be operable to amplify the entire cable television/DOCSIS spectrum (~1 GHZ) and/or may be operable to amplify the entire spectrum (~1 GHZ) of a direct broadcast satellite signal output by a low-noise block downconverter.

The example subsystem 108d comprises a mixer 155 operable to generate an in-phase signal and a quadrature phase signal from the received RF signal. Additionally, the mixer 155 may be operable to downconvert the received RF signal. Like the LNA 154, the mixer 155 may be sufficiently wideband to process the entire spectrum of the applicable communications protocol/standard. In other example implementations, the mixer 104 may not be a quadrature mixer. In such an implementation, a single signal, rather than I and Q signals, may be output to a single ADC, rather than a pair of ADCs. In other example implementations, the subsystem 108d may comprise an ADC that directly digitizes the received, filtered RF signal.

The example subsystem 108d comprises a pair of filters 158a and 158b operable to filter, respectively, the in-phase and quadrature phase outputs of the mixer 155. Each of the filters 158 may comprise a passband corresponding to the spectrum (the RF spectrum where the mixer does not perform downconversion and the IF or baseband spectrum where the mixer 155 does perform downconversion) of the communications protocol/standard of interest, and may provide sufficient attenuation of signals outside the desired spectrum.

The example subsystem 108d comprises a pair of analog-to-digital converters 159a and 159b operable to digitize, respectively, the in-phase and quadrature phase outputs of the filters 159a and 159b. Each of the ADCs 159 may be operable to concurrently digitize the entire spectrum of the applicable communications protocols/standard (e.g., cable television/DOCSIS or direct broadcast satellite). In an example implementation, each of the ADCs may be as described in U.S. patent application Ser. No. 13/485,003 and/or U.S. patent application Ser. No. 13/336,451, each of which is hereby incorporated by reference in its entirety.

The example subsystem 108d comprises a digital front end (DFE) 160 operable to combine the in-phase and quadrature-phase digitized spectrums from the ADCs 159a and 159b (including performing filtering, noise cancellation, and/or other operations for improving signal quality), and to perform channelization of the resulting spectrum. The channelization may comprise selecting up to N (an integer) channels of the digitized spectrum for output as signals $113_1$-$113_N$. For example, each of the channels $113_1$-$113_N$ may comprise a 6 or 8 MHz wide television channel.

The example subsystem 108d comprises a plurality, N, of the demodulators 114. Each of the demodulators 114 may be as described with reference to FIG. 1A.

The example subsystem 108d comprises an interface transmitter 176 operable to multiplex the datastreams $115_1$-$115_N$ (e.g., MPEG transport streams) onto a link 177 (which may comprise, for example, fewer than N conductors). The link 177 connects subsystem 108d to subsystem 110d. The link 177 may be a wireline, wireless, or fiber optic link. In various example implementations in which signals from multiple subsystems 108 may be communicated to a single subsystem 110, the interface transmitter 176 may perform time-stamping messages sent onto the link 177. The subsystem 110d may use the time-stamps for combining the received data (e.g., to determine which data from a first subsystem 108 corresponds to which data from a second subsystem 108, and so on).

The example subsystem 110d comprises an interface receiver 178 operable to receive the signal(s) over the link 177 and de-multiplex the signal(s) to recover the datastreams $115_1$-$115_N$. In an example implementation, the interface receiver 178 may be operable to perform combining (e.g., maximal ratio combining) and/or MIMO processing as, for example, described below with reference to FIG. 2B.

The example subsystem 110d comprises a media access control (MAC) and/or datastream processing circuit 124 operable to perform OSI layer 2 (media access control) and, optionally, higher OSI layer (e.g., network layer) processing of the datastreams $115_1$-$115_N$ (e.g., MPEG transport streams).

Figure 1E:
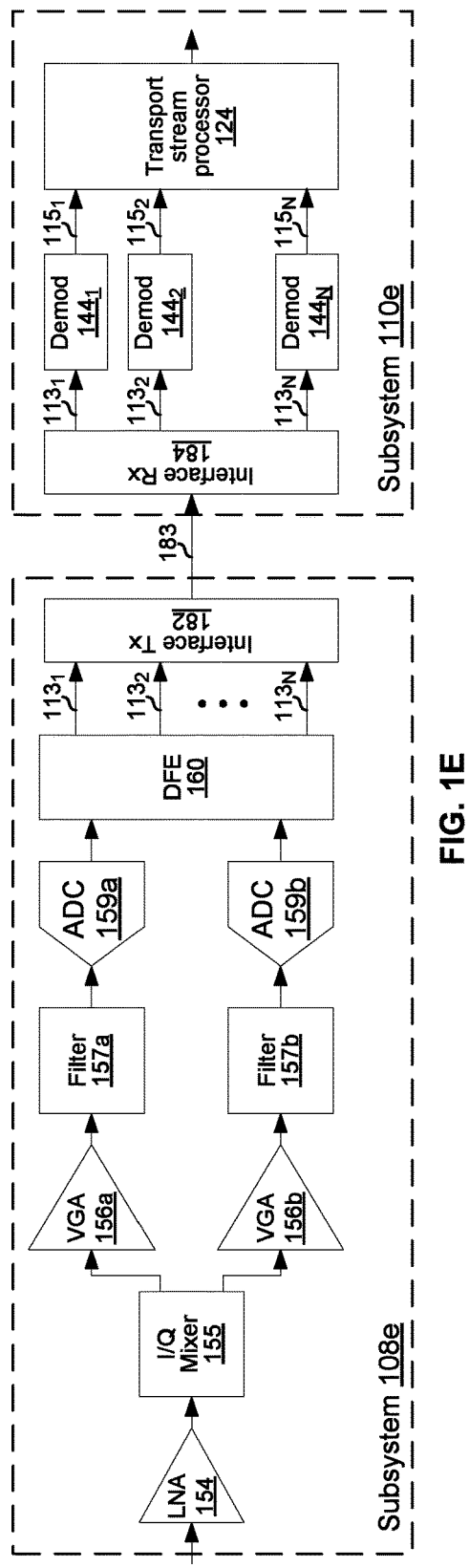
FIG. 1E depicts a second example full-spectrum capture receiver architecture in which subsystems are partitioned in a second manner.

An advantage of the receiver architecture in FIG. 1D, relative to the architecture of FIG. 1E, is that the link 177 between the subsystems may operate at a lower data rate than the link 183 (e.g., because redundancy and other physical layer overhead has already been removed by the demodulators 114). A disadvantage of the architecture in FIG. 1D, relative to the architecture of FIG. 1E, is that, where the subsystem 108d is implemented in a low-density (e.g., higher feature size) process (e.g., to improve analog performance), the demodulator(s) $114_1$-$114_N$ may require a large amount die area (e.g. to accommodate interleaver memory).

FIG. 1E depicts a second example full-spectrum capture receiver architecture in which subsystems are partitioned in a second manner. The receiver in FIG. 1E comprises a first subsystem 108e and a second subsystem 110e.

Like the example subsystem 108d in FIG. 1D, the example subsystem 108e comprises the LNA 154, the VGAs 156, the filters 158, the ADCs 159, the DFE 160, and may or may not comprise one or more mixers 155. The example subsystem 108e differs from the example subsystem 108d in that it does not comprise demodulators and that it comprises a different (or differently configured) interface transmitter 182. The interface transmitter 182 multiplexes the channels $113_1$-$113_N$ onto the link 183 (which may comprise, for example, fewer than N conductors). The link 183 connects subsystem 108e to subsystem 110e. The link 183 may be a wireline, wireless, or fiber optic link. In various example implementations in which signals from multiple subsystems 108 may be communicated to a single subsystem 110, the interface transmitter 182 may perform time-stamping messages sent onto the link 183. The subsystem 110e may use the time-stamps for combining the received data (e.g., to determine which data from a first subsystem 108 corresponds to which data from a second subsystem 108, and so on).

Like the example subsystem 110d, the example subsystem 110e comprises the MAC and/or datastream processing circuit 124. The example subsystem 110e differs from the example subsystem 110d in that it comprises demodulators $144_1$-$144_N$ and a different (or differently-configured) interface receiver 184. The interface receiver 184 may be operable to receive the signal(s) over the link 183 and de-multiplex the signal(s) to recover the channels $113_1$-$113_N$. The demodulators $144_1$-$144_N$ may each be operable to perform the same functions as the demodulators $114_1$-$114_N$ described above with reference to FIG. 1D.

An advantage of the architecture of FIG. 1E relative to the architecture in FIG. 1D is that the demodulators may be integrated with digital-only circuitry, which may accommodate use of a higher-density process (e.g., to reduce size of interleaver memory). A disadvantage of the architecture of FIG. 1E relative to the architecture of FIG. 1D is that the link 183 between the two subsystems may need to operate at a higher data rate (e.g. 180 Mbps vs. 40 Mbps).

Figure 1F:
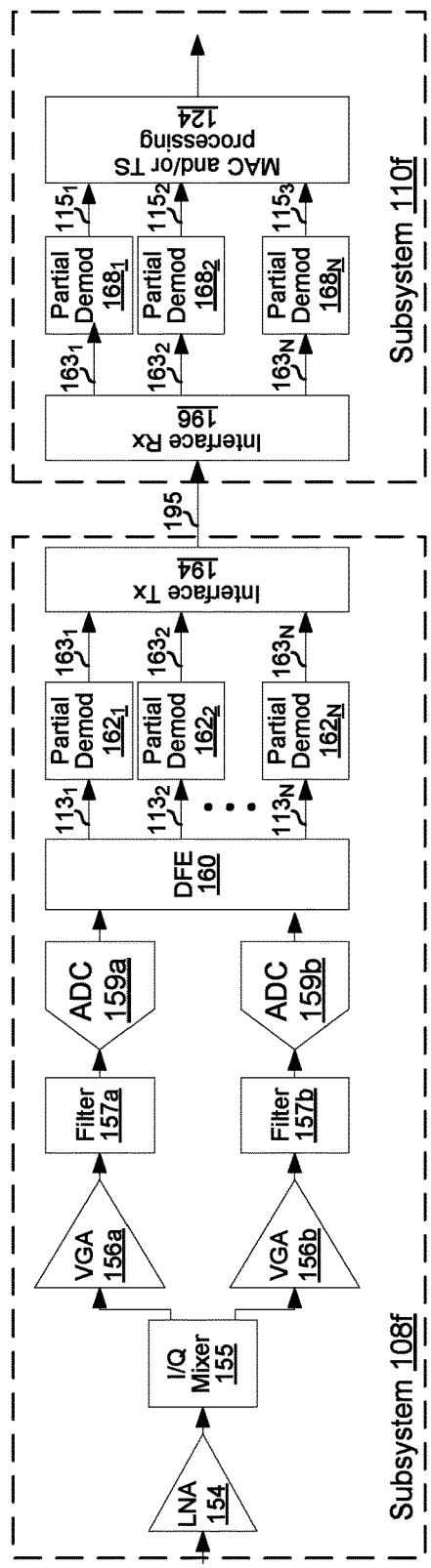
FIG. 1F depicts a third example receiver full-spectrum capture architecture in which subsystems are partitioned in a third manner.

FIG. 1F depicts a third example receiver architecture in which subsystems are partitioned in a third manner. Like the example subsystem 108d in FIG. 1D, the example subsystem 108f comprises the LNA 154, the VGAs 156, the filters 158, the ADCs 159, the DFE 160, and may or may not comprise one or more mixers 155. The example subsystem 108f differs from the example subsystem 108d in that it includes partial demodulators $162_1$-$162_N$ and that it comprises a different (or differently configured) interface transmitter 194.

Each of the partial demodulators $162_1$-$162_N$ may be operable to perform a subset of the demodulation operations (e.g., timing recovery, equalization, symbol slicing, etc.) for signals generated in accordance with one or more standards/protocols. Example protocols/standards include terrestrial television standards/protocols, cable television standards/protocols, and DOCSIS standards/protocols, and Direct Broadcast Satellite (DBS) standards/protocols. Each partial demodulator $162_1$-$162_N$ may output a respective one of signals $163_1$-$163_N$ which may, for example, be hard decision outputs of a symbol de-mapper, soft decision outputs of a symbol de-mapper (e.g., log-likelihood ratios), and/or equalizer settings (e.g., number of taps and/or tap coefficients).

The interface transmitter 164 may be operable to multiplex the signals $163_1$-$163_N$ onto the link 195 (which may comprise, for example, fewer than N conductors). The link 195 connects subsystem 108c to subsystem 110c. The link 195 may be a wireline, wireless, or fiber optic link. In various example implementations in which signals from multiple subsystems 108 may be communicated to a single subsystem 110, the interface transmitter 194 may perform time-stamping messages sent onto the link 195. The subsystem 110f may use the time-stamps for combining the received data (e.g., to determine which data from a first subsystem 108 corresponds to which data from a second subsystem 108, and so on).

Like the example subsystem 110d, the example subsystem 110f comprises the datastream processing circuit 124. The example subsystem 110f differs from the example subsystem 110d in that it comprises partial demodulators $168_1$-$168_N$ and a different (or differently configured) interface receiver 196. The interface receiver 196 may be operable to receive the signal(s) over the link 194 and de-multiplex the signal(s) to recover the signals $163_1$-$163_N$. The partial demodulators $168_1$-$168_N$ may each be operable to perform a subset of the demodulation operations (e.g., FEC decoding) that complement demodulation operations performed by the partial demodulators $162_1$-$162_N$ (e.g., that complete demodulation of signals generated in accordance with the applicable standards/protocols).

The data rate of the link 195 may be somewhere between the data rate of the link 177 in FIG. 1D and the data rate of the link 183 of FIG. 1E. For example, the link 195 may operate at 54 Mbps, the link 195 may operate at 40 Mbps, and the link 177 may operate at 180 Mbps An advantage of the architecture of FIG. 1F relative to the architecture in FIG. 1D is that most or all of the analog portions of the demodulation operations may be performed in the subsystem 108f that is implemented in the lower-density process and most or all of the digital portions of the demodulation process may be performed in the subsystem 110f that is implemented in higher-density process. Such a partitioning may optimize the cost and size of the overall system comprising subsystems 108f and 110f.

In the remainder of this disclosure, references to subsystem 108 may refer to any of the subsystems 108a, 108b, 108c, 108d, 108e, and 108f or variations thereof, and references to subsystem 110 may refer to any of the subsystems 110a, 110b, 110c, 110d, 110e, and 110f or variations thereof—with the assumption that the subsystems are properly paired (i.e., 108a is used with 110a, 108b is used with 110b, 108c is used with 110c, 108d is used with 110d, 108e is used with 110e, 108f is used with 110f).

Figure 2A:
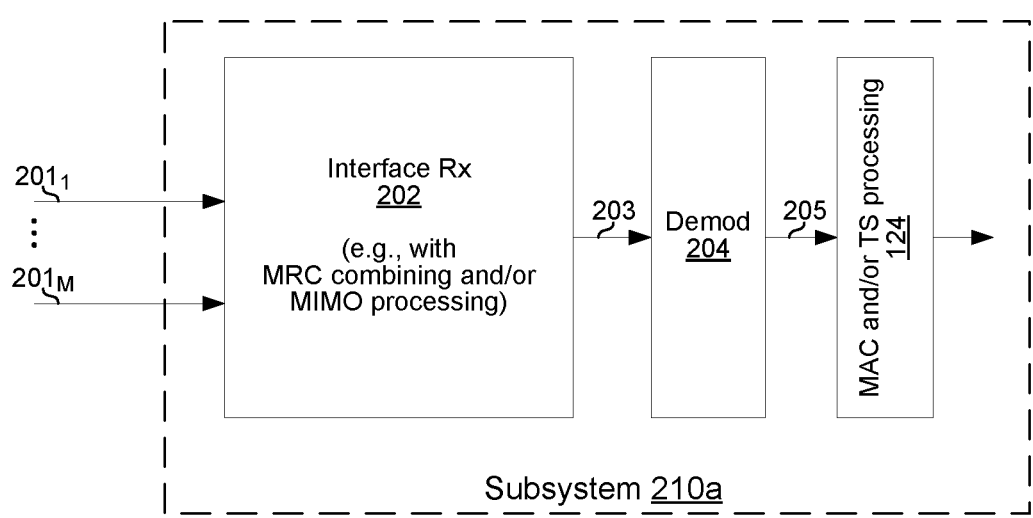
FIG. 2A depicts an example second subsystems operable to receive signals from multiple instances of a first subsystem.

FIG. 2A depicts an example second subsystems operable to receive signals from multiple instances of a first subsystem. Each of the signals $201_1$-$201_M$ corresponds to a signal received over any of the links 117, 153, and 165. The interface receiver 202 corresponds to any of the interface receivers 122, 142, and 166. The demodulator 204 corresponds to either of the demodulator 144 and the partial demodulator 168. In instances that each of the signals $201_1$-$201_M$ corresponds to the same received signal, the interface receiver 202 may coherently combine the signals $201_1$-$201_M$ (e.g., using maximal ratio combining) to recover the signal. In instances that each of the signals $201_1$-$201_M$ corresponds to a different received signal, the interface receiver 202 may combine the signals $201_1$-$201_M$ (e.g., in accordance with a multiple-in-multiple-out (MIMO) scheme) to recover the signals.

Figure 2B:
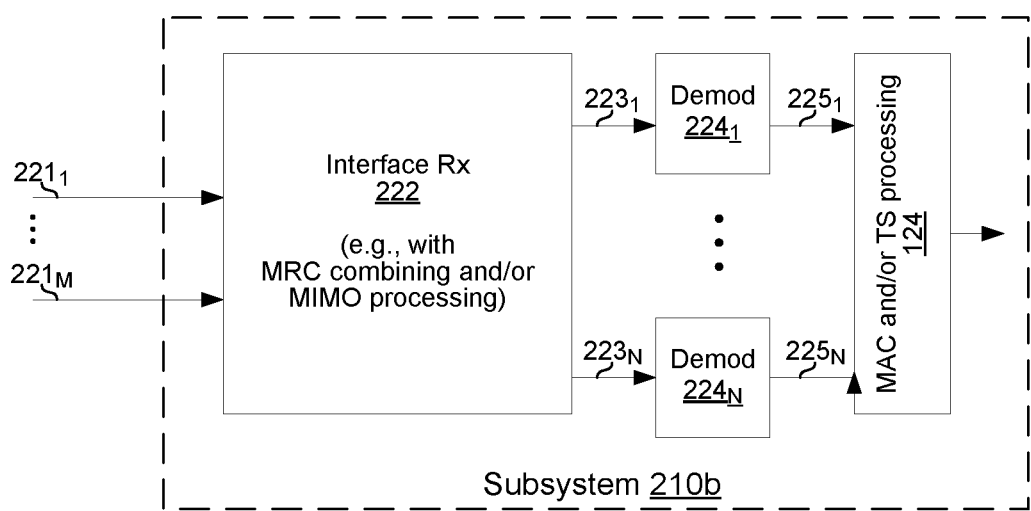
FIG. 2B depicts an example second subsystems operable to receive signals from multiple instances of a first full-spectrum capture subsystem.

FIG. 2B depicts an example second subsystems operable to receive signals from multiple instances of a first full-spectrum capture subsystem. Each of the signals $221_1$-$221_M$ corresponds to a signal received over any of the links 177, 183, and 195. The interface receiver 222 corresponds to any of the interface receivers 178, 184, and 196. Each of the demodulators $224_1$-$224_N$ corresponds to either of the demodulator 144 and the partial demodulator 168. In instances that each of the signals $221_1$-$221_M$ corresponds to the same received signal, the interface receiver 222 may coherently combine the signals $221_1$-$221_M$ (e.g., using maximal ratio combining) to recover the signal. In instances that each of the signals $221_1$-$221_M$ corresponds to a different received signal, the interface receiver 222 may combine the signals $221_1$-$221_M$ (e.g., in accordance with a multiple-in-multiple-out (MIMO) scheme) to recover the signals.

FIGS. 3A-3F depict example implementations of a distributed receiver. In the example implementations depicted, the signals from multiple subsystems 108 are combined in the subsystem 210 as described above with reference to FIGS. 2A and/or 2B.

Figure 3A:
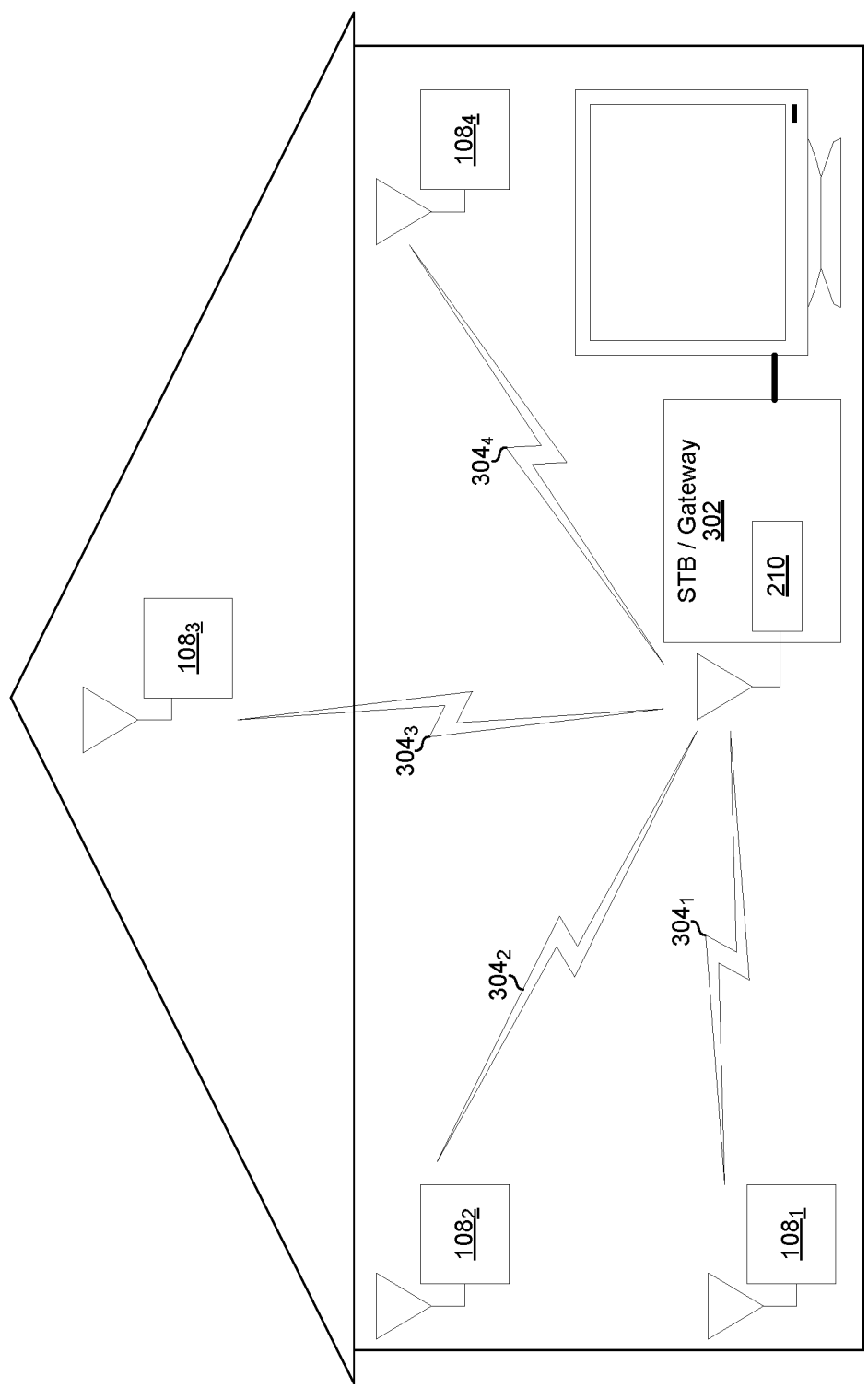
FIGS. 3A-3F depict example implementations of a distributed receiver.
Figure 3B:
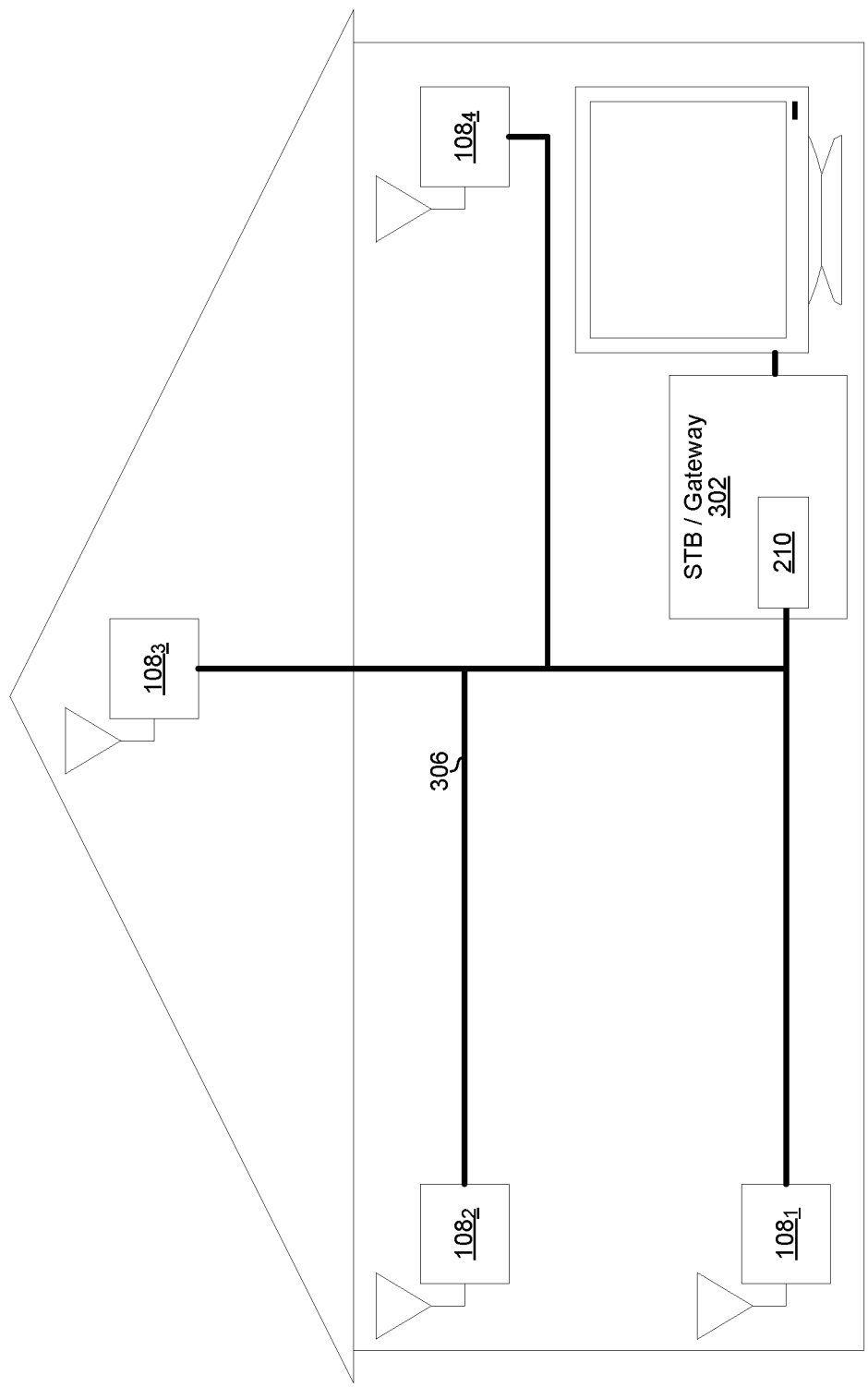

In FIGS. 3A and 3B, a plurality of instances of the subsystem 108 are distributed throughout a premises. Each of the subsystems $108_1$-$108_4$ receives a wireless signal (e.g., a terrestrial television signal or a cellular signal). Each of the subsystems $108_1$-$108_4$ processes the received signal as described above with reference to FIGS. 1A, 1B, 1C, 1D, 1E, and/or 1F and output a signal such as is output via link 117, 153, 165, 177, 183, and/or 195. For example, in FIG. 3A the interface transmitters of the subsystems 108 may transmit in accordance with a wireless protocol such as Wi-Fi, Zigbee, wireless USB, or the like, and in FIG. 3B the interface transmitters of the subsystems 108 may transmit in accordance with a wireline protocol such as 10/100/1GBASE-T, Ethernet over Coax, USB, IEEE-1394, or the like, or a fiber optic protocol such Ethernet over Passive Optical Network (EPON).

Figure 3C:
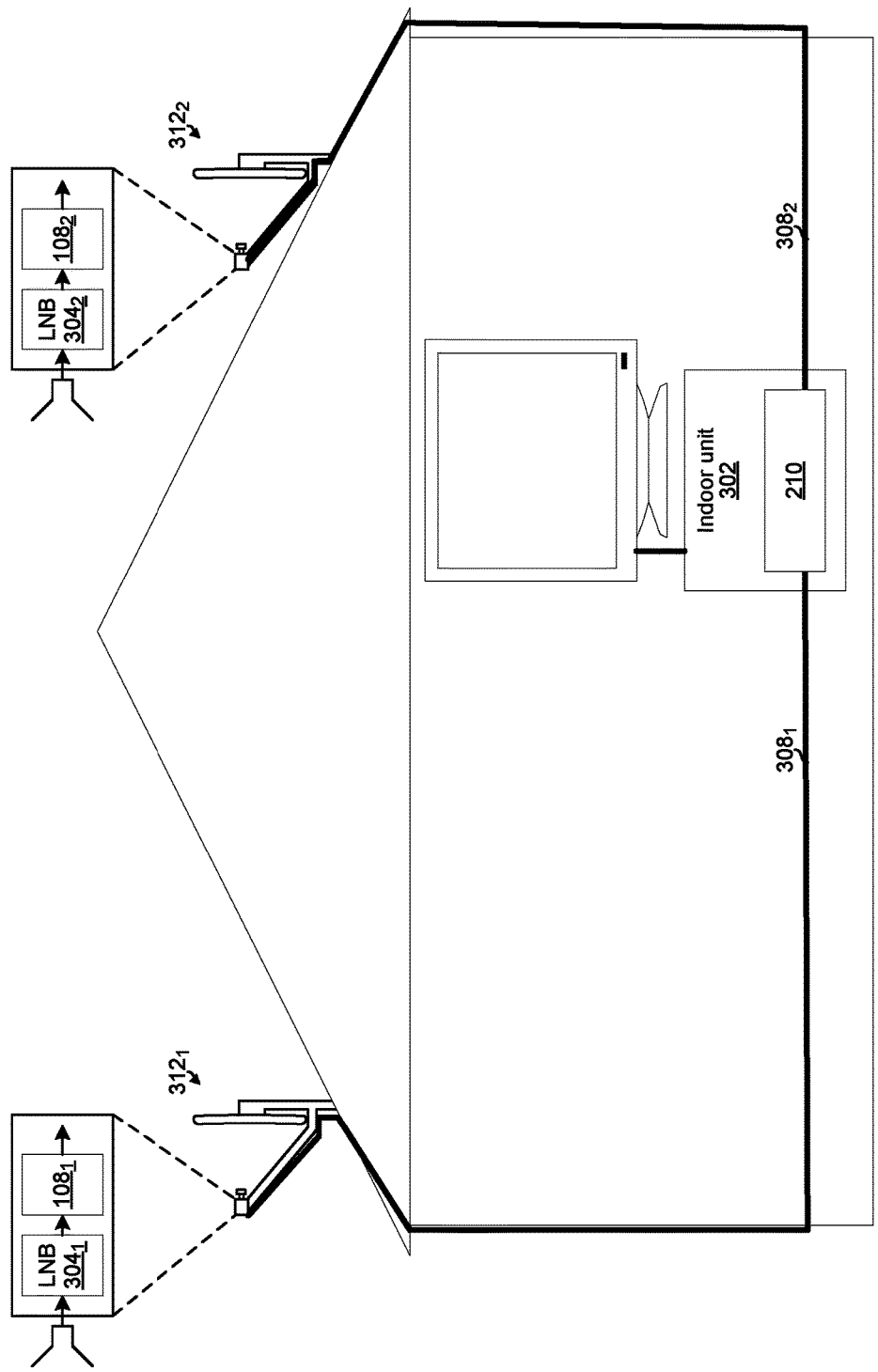
Figure 3D:
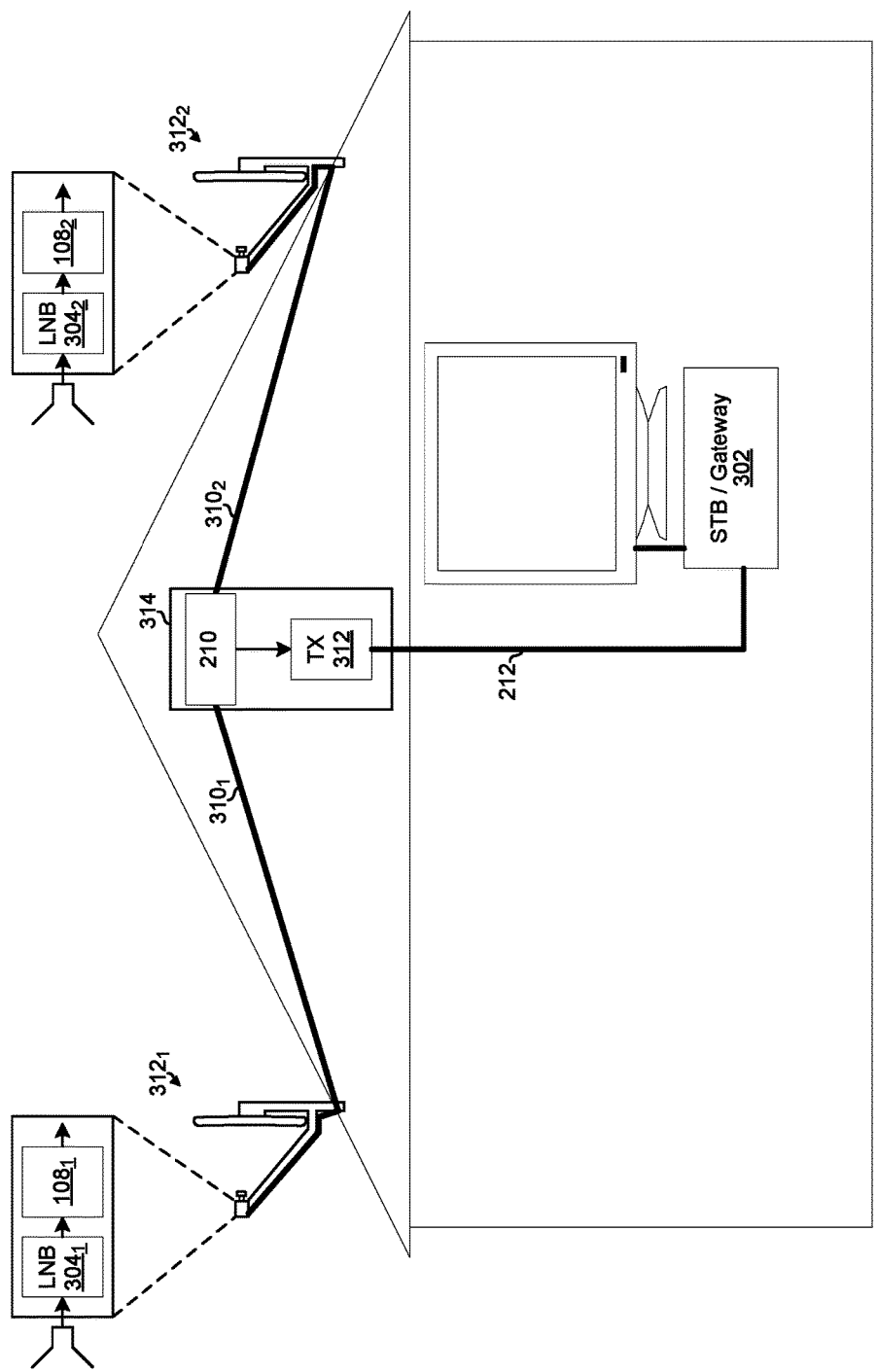

In FIGS. 3C and 3D, an instance of the subsystem 108 resides in each of a plurality of satellite reception assemblies 312 (e.g., DBS satellite "dishes"). Each of the subsystems 108 receives a down-converted satellite signal from a respective one of low noise block down-converters (LNBs) $304_1$ and $304_2$. Each subsystem 108 processes its respective satellite signal as described above with reference to FIGS. 1A, 1B, 1C, 1D, 1E, and/or 1F, and outputs a signal such as is sent over the link 117, 153, 165, 177, 183, and/or 195.

Figure 3E:
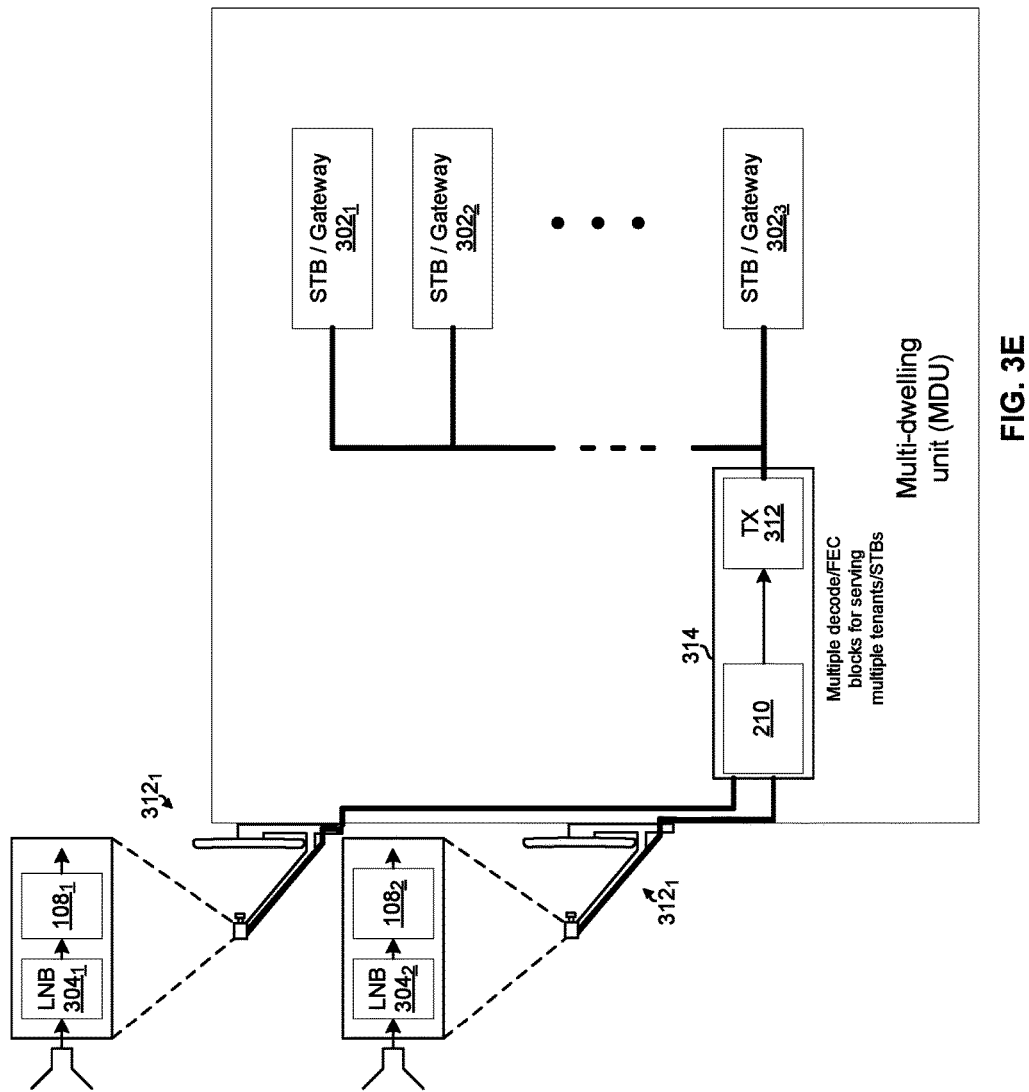

In FIG. 3C, the outputs of the subsystems $108_1$-$108_2$ are conveyed, via links 308 (e.g., coaxial cables), to an indoor unit 302 (e.g., comprising a satellite set-top box and DSL modem, or a terrestrial television receiver) comprising an instance of subsystem 210. In FIG. 3D, the outputs of the subsystems $108_1$-$108_2$ may be conveyed (e.g., using Ethernet, MoCA, HDMI, or the like), via links 310 (e.g., coaxial cables), to a hub 314 and one or more gateways 302 (which together may be referred to as an "indoor unit"). FIG. 3E depicts the hub 314 in a multi-dwelling unit (MDU) serving a plurality of gateways 302.

In an example implementation, each of three satellite dish assemblies $312_1$, $312_2$, and $312_3$ may be substantially the same and may all collect the same satellite signal—with each collected signal having different noise levels and noise characteristics due, for example, to slightly different location, alignment, non-idealities in the electronics, etc. A subsystem 108 of each of the satellite dish assemblies may output a signal to a subsystem 210. The power from the collected signals may be combined by the interface receiver of the subsystem 210. In such an implementation, the combined signal power (in log units) may increases by 20 log(3) while the noise power combines non-coherently and increases by 10 log(3). This would lead to a net improvement in signal-to-noise ratio (SNR) of 10 log(3) in the log domain, or 3 in the linear domain. In other words, the effective gain of the combined antenna may be increased a factor of 3 compared with the gain of one satellite reception assembly. In one such example implementation, digitized signal information may be output from each of the subassemblies $108_1$-$108_3$ of the three satellite reception assemblies and combined in the in the subsystem 210 which may use, for example, maximum ratio combining. The resulting diversity combined signal may then be demodulated in the subsystem 210. The cascading of satellite reception assemblies 312 in close proximity to one another may be done, for example, in an area which has poor satellite reception. In such an area, multiple satellite reception assemblies may be placed, for example, next to each other on the roof of a house and/or the roofs of neighboring houses and used to collect the signals, which may then be combined to achieve better reception.

Figure 3F:
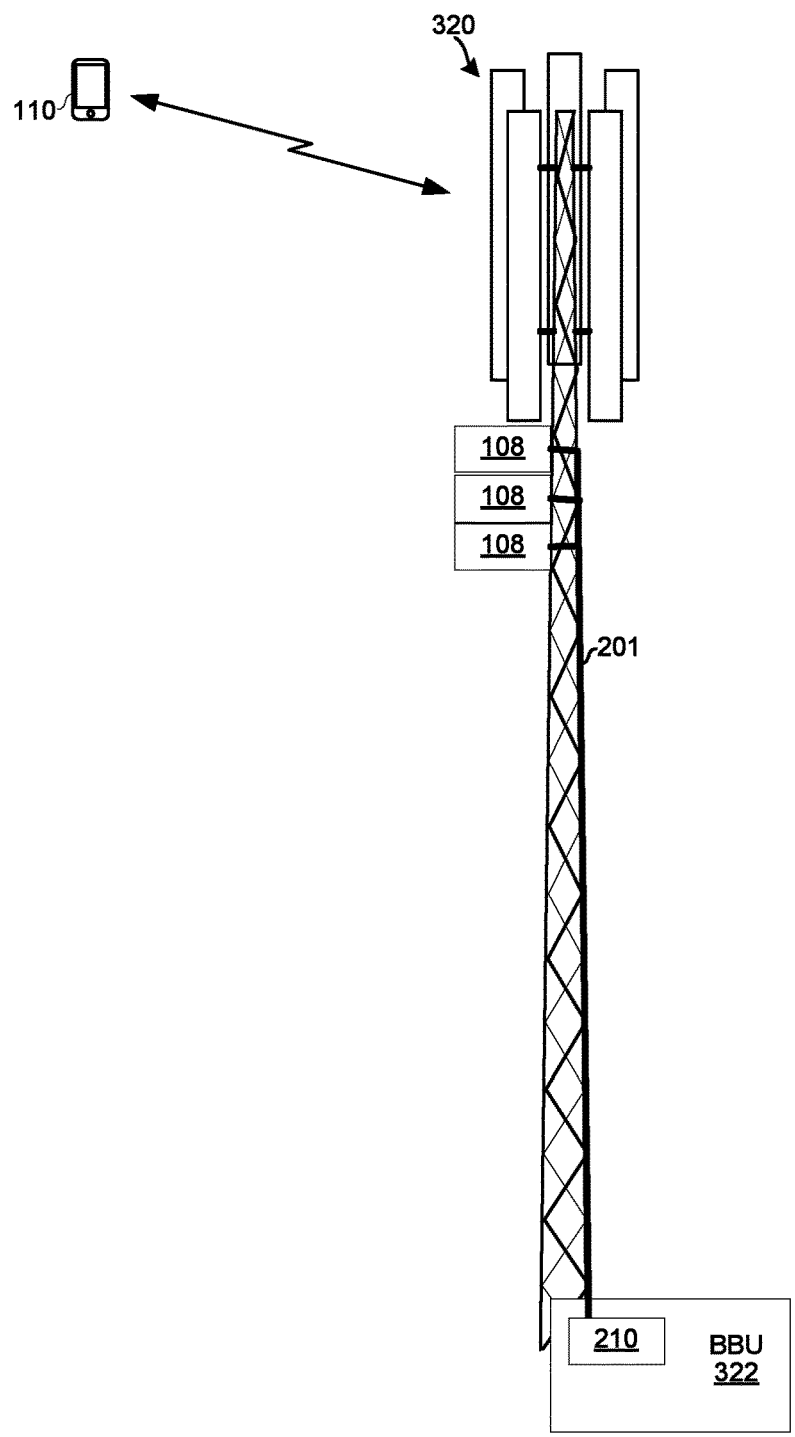

FIG. 3F depicts an example implementation in which a plurality of remote radio units (RRUs) of a cellular basestation comprise a plurality of subsystems 108 and the subsystems 108 output signals to a baseband unit (BBU) of the basestation.

Figure 4:
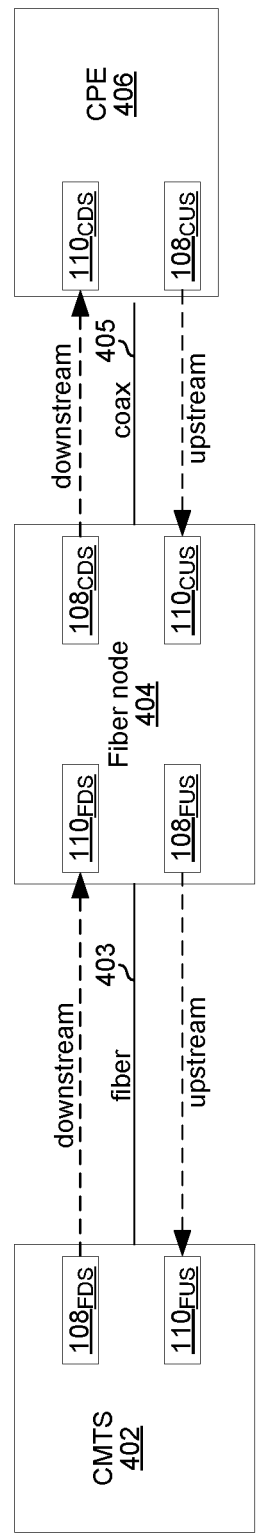
FIG. 4 depicts an example fiber node using a distributed receiver architecture.

FIG. 4 depicts an example cable modem termination system (CMTS) and fiber node using a distributed receiver architecture. Shown in FIG. 4, is a CMTS 402, a fiber node 404, and customer premise equipment (CPE) 406, each comprising one or more instances of subsystem 108 and subsystem 110.

Fiber downstream traffic may be conveyed from the subsystem $108_{FDS}$ in the CMTS 402 to the subsystem $110_{FDS}$ in the fiber node 404. Accordingly, the interface transmitter and receiver of the subsystems $108_{FDS}$ and $110_{FDS}$ may be operable to communicate over the fiber optic cable 404. For example, the subsystem $108_{FDS}$ may correspond to the subsystem 108c in FIG. 1C, the subsystem $110_{FDS}$ may correspond to the subsystem 110c, and soft-decision outputs (e.g., LLRs) of a de-mapper may be sent over the fiber 404.

Fiber upstream traffic may be conveyed from the subsystem $108_{FUS}$ in the fiber node 404 to the subsystem $110_{FUS}$ in the CMTS 402. Accordingly, the interface transmitter and receiver of the subsystems $108_{FUS}$ and $110_{FUS}$ may be operable to communicate over the fiber optic cable 404. For example, the subsystem $108_{FUS}$ may correspond to the subsystem 108c in FIG. 1C, the subsystem $110_{FUS}$ may correspond to the subsystem 110c, and soft-decision outputs (e.g., LLRs) of a de-mapper may be sent over the fiber 404.

Coaxial downstream traffic may be conveyed from the subsystem $108_{CDS}$ in the fiber node 404 to the subsystem $110_{CDS}$ in the CPE 406. Accordingly, the interface transmitter and receiver of the subsystems $108_{CDS}$ and $110_{CDS}$ may be operable to communicate over the coaxial cable 404. For example, the subsystem $108_{CDS}$ may correspond to the subsystem 108c in FIG. 1C, the subsystem $110_{CDS}$ may correspond to the subsystem 110c, and soft-decision outputs (e.g., LLRs) of a de-mapper may be sent over the coaxial cable 405.

Coaxial upstream traffic may be conveyed from the subsystem $108_{CUS}$ in the CPE 406 to the subsystem $110_{CUS}$ in the fiber node 404. Accordingly, the interface transmitter and receiver of the subsystems $108_{CUS}$ and $110_{CUS}$ may be operable to communicate over the coaxial cable 405. For example, the subsystem $108_{CUS}$ may correspond to the subsystem 108c in FIG. 1C, the subsystem $110_{CUS}$ may correspond to the subsystem 110c, and soft-decision outputs (e.g., LLRs) of a de-mapper may be sent over the coaxial cable 405.

Figure 5:
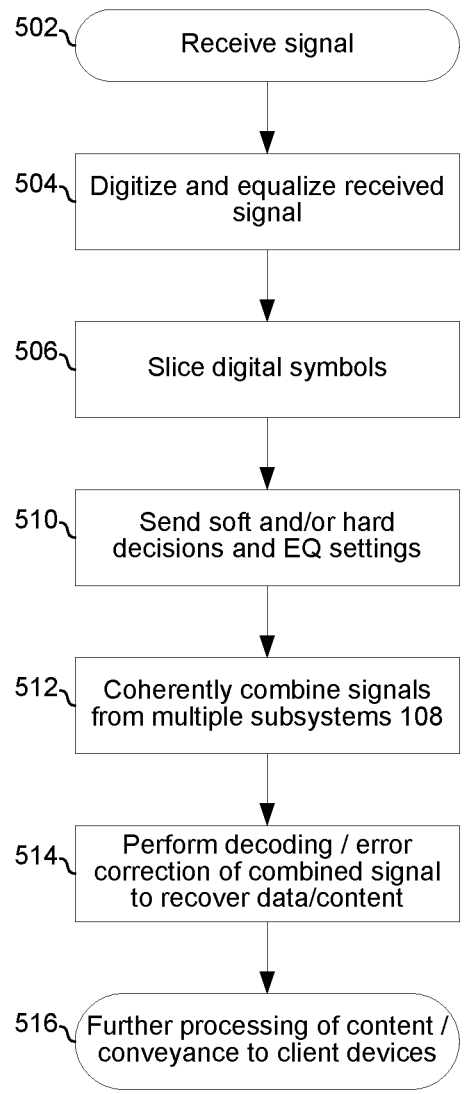
FIG. 5 is a flowchart illustrating an example process for reception via a distributed receiver.

FIG. 5 is a flowchart illustrating an example process for reception via a distributed receiver. The process begins with block 502 in which a wireless signal is received by a plurality of subsystems 108. The signal may be of any frequency and/or standard. In block 504 each of the subsystems 108 digitizes and equalizes the received signal. For example, for a satellite broadcast television signal, an entire ~1 GHz spectrum from a LNB may be digitized and equalized. In block 506, the subsystem 108 may slice the digitized symbols. The slicing may comprise generating hard and/or soft decisions (e.g., LLRs) regarding what symbol was received at particular time instants. In block 510, the hard and/or soft decisions and/or EQ settings (where the subsystem 108 is in a fixed location, the EQ settings may be sent only occasionally or periodically) may be sent from the subsystems 108 to the subsystem 110. In block 512, the subsystem 110 may coherently combine the signals from the plurality of subsystems $108_1$. In block 514, the subsystem 110 may decode, error correct, and/or perform other processing of the combined signal to recover data (e.g., television content) carried in the signal. The subsystem 110 may comprise circuitry operable to decode and error correct a plurality of channels concurrently for concurrently serving a plurality of client devices. In block 516 the recovered data may be further processed for conveyance to client devices (e.g., televisions, set-top boxes, personal computers, and the like.).

Figure 6:
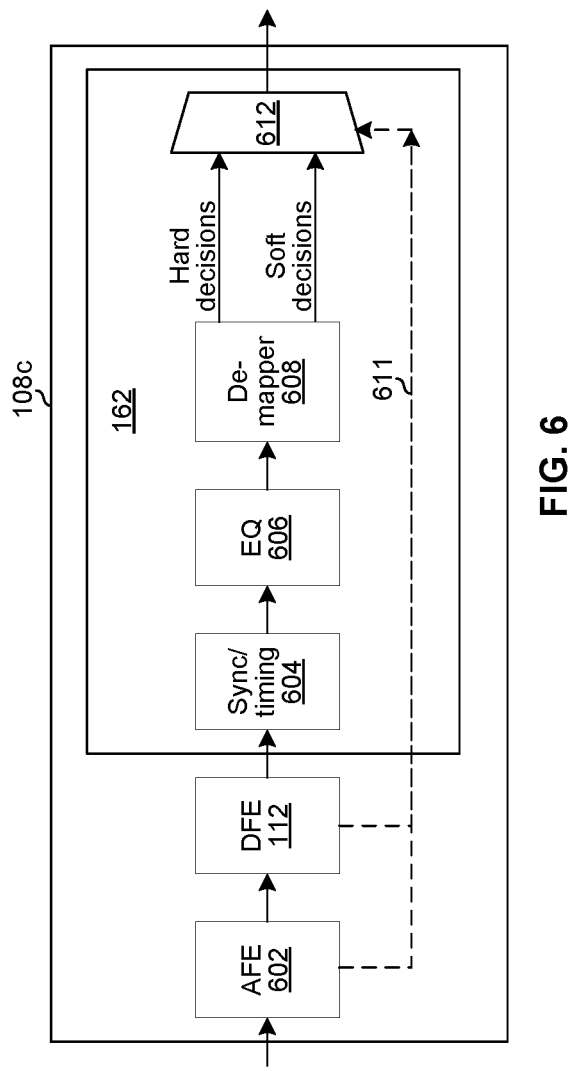
FIG. 6 depicts a portion of a distributed receiver.

FIG. 6 depicts example details of the subsystem 108c of FIG. 1C. In the example implementation depicted the subsystem 108c comprises an analog front end (e.g., corresponding to components 102, 104, 106, 109, 111 of FIG. 1C), the digital front-end 112, and a partial demodulator 162. The partial demodulator 162 comprises a synchronization/timing recovery circuit 604, an equalization circuit 606, a de-mapper 608 that is operable to generate a soft decision output (e.g., LLRs) and a hard decision output, and a multiplexer 612. The multiplexer 612 may be controlled by a control signal 611 based, for example, on received signal strength, signal-to-noise ratio of a received signal, and/or any other suitable characteristics of the received signal. For example, where an instance of the subsystem 108 receives a strong signal and/or high SNR signal, that instance of subsystem 108 may output LLRs to the subsystem 110, but where the instance of subsystem 108 does not receive a strong and/or high SNR signal it may output nothing, and/or only hard decisions from the de-mapper to the subsystem 110. In this manner, more bandwidth on the LAN that connects the subsystems 108 to the subsystem 110 may be allocated to instances of the subsystem 108 that have the best reception, thereby resulting in a combined signal at the subsystem 110 that is stronger and/or higher SNR.

In an example implementation, data sent over the link between subsystem 108 and subsystem 110 may be compressed to further reduce the amount of bandwidth needed on the link. Such bandwidth reduction may, for example, increase the number of subsystems 108 that a single subsystem 110 can concurrently pair with. For example, where LLRs are sent over the link, entropy coding may be used to take advantage of the non-uniform distribution of the LLRs.

Figure 7:
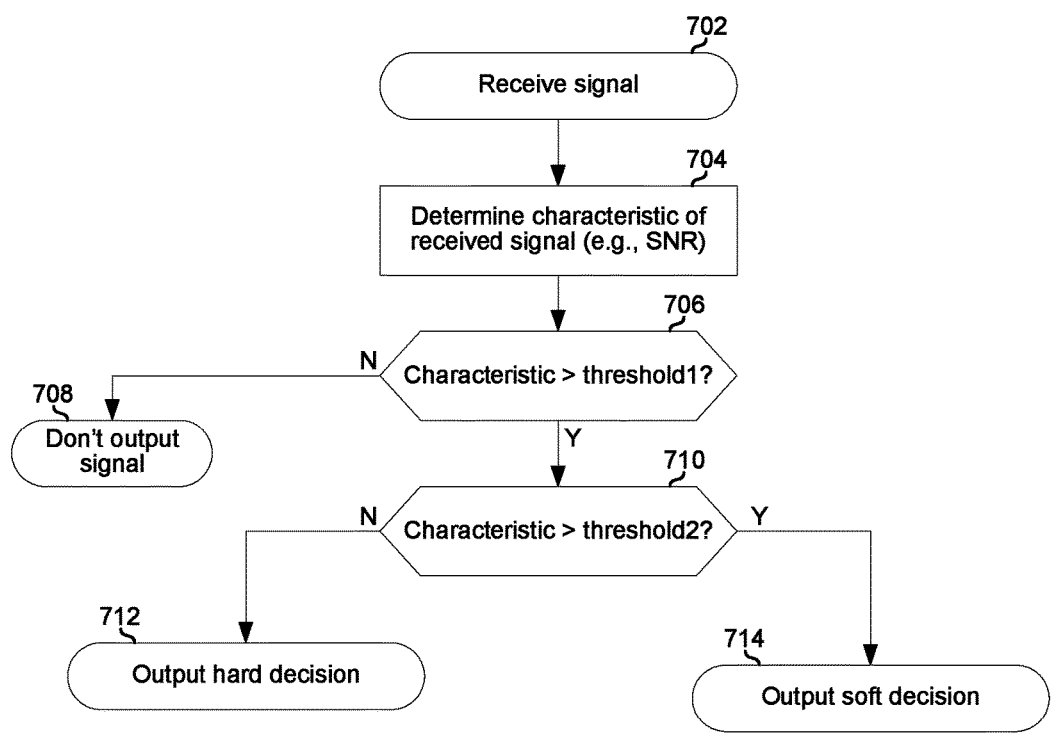
FIG. 7 is a flowchart illustrating an example process for reception via a distributed receiver.

FIG. 7 is a flowchart illustrating an example process for reception via a distributed receiver. The example process begins with block 702 in which a signal is received by a subsystem 108. In block 704, the subsystem 108 determines one or more characteristics (e.g., received signal strength, SNR, or the like) of the received signal. In block 706 the subsystem 108 determines whether the characteristic(s) is/are above a determined threshold ("threshold1"). If the characteristic(s) is/are not above threshold1, then, in block 708 the subsystem 108 does not output a signal to the subsystem 110. If the characteristic(s) is/are above threshold1, then the process advances to block 710. In block 710 the subsystem determines whether the characteristic(s) is/are above a determined threshold ("threshold2"). If the characteristic(s) is/are not above threshold2, then, in block 712 the subsystem 108 outputs a hard decision to the subsystem 110. If the characteristic(s) is/are above threshold2, then, in block 712 the subsystem 108 outputs a soft decision (e.g., LLR) to the subsystem 110. In this manner, since sending soft decisions may require more bandwidth, more bandwidth may be available for subsystems 108 which have "good" reception (e.g., high SNR) of the signal.

The process of FIG. 7 may be implemented by each of a plurality of instances of the subsystem 108 (e.g., each of the instances in any of FIGS. 3A-3F). Through a process such as the one depicted in FIG. 7, selective use of one or more of subsystems 108 may enable a receiver comprising a plurality of subsystems 108 and a subsystem 110 to receive signals of a variety of standards, on a wide range of frequencies, and from a wide range of signal sources. That is, different subsystems 108 can be used to receive different signals, from different sources, etc.

In various example implementations, a first semiconductor die (e.g., 210a) may comprise an interface circuit (e.g., 202) and a demodulation circuit (e.g., 204). The interface circuit may be operable to receive an externally generated (i.e. generated "off-chip" by, for example, another semiconductor die) signal and recover decisions of a symbol de-mapper carried in the externally-generated signal. The demodulation circuit may be operable to recover one or more datastreams based on the decisions of the symbol de-mapper. The first semiconductor die may comprise circuitry (e.g., 202) operable to combine a plurality of signals from a plurality of second semiconductor dice (e.g., 108c), where each of the plurality of signals comprises decisions of a respective one of a plurality of symbol de-mappers. The first semiconductor die may reside in a direct broadcast satellite (DBS) indoor unit (e.g., 314 or 302). Each of the plurality of second semiconductor dice may reside in a respective one of a plurality of direct broadcast satellite (DBS) reception assemblies. The first semiconductor die may reside in cable television customer premise equipment (e.g., 406). The demodulation circuit may be operable to perform forward error correction decoding based on the recovered decisions from the symbol de-mapper. The interface circuit may be operable to recover equalizer settings carried in the externally-generated signal. The decisions of the symbol de-mapper may be formatted as log-likelihood ratios. The decisions of the symbol de-mapper may be hard decisions when a corresponding signal-to-noise ratio is below a determined threshold and may be soft decisions when said corresponding signal-to-noise ratio is above said determined threshold.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a distributed receiver.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A first semiconductor die comprising:
an interface receiver circuit operable to:
receive an externally-generated signal that carries decision outputs of a symbol de-mapper that is external to the first semiconductor die, the externally-generated signal comprising a plurality of time stamps, each one of the plurality of time stamps corresponding to one of the decision outputs of the symbol de-mapper, and
process the externally-generated signal to recover the decision outputs of the symbol de-mapper carried in the externally-generated signal; and
a demodulation circuit operable to recover one datastreams based on the decision outputs of the symbol de-mapper.

2. The first semiconductor die of claim 1, further comprising:
circuitry operable to combine a plurality of signals from a plurality of second semiconductor dice, each of the plurality of signals comprising decision outputs of a respective one of a plurality of symbol de-mappers that are external to the first semiconductor die.

3. The first semiconductor die of claim 2, wherein:
the first semiconductor die resides in a baseband unit of a cellular basestation; and
each of the plurality of second semiconductor dice resides in a respective one of a plurality of remote radio units of a satellite basestation.

4. The first semiconductor die of claim 1, wherein the first semiconductor die resides in a direct broadcast satellite (DBS) indoor unit and each of the plurality of second semiconductor dice resides in a respective one of a plurality of DBS reception assemblies.

5. The first semiconductor die of claim 1, wherein the first semiconductor die resides in cable television customer premise equipment.

6. The first semiconductor die of claim 1, wherein the interface receiver circuit is further operable to recover equalizer settings carried in the externally-generated signal.

7. The first semiconductor die of claim 1, wherein the decision outputs of the symbol de-mapper are formatted as log-likelihood ratios.

8. The first semiconductor die of claim 1, wherein the decision outputs of the symbol de-mapper are hard decision outputs when a corresponding signal-to-noise ratio is below a determined threshold and are soft decision outputs when the corresponding signal-to-noise ratio is above the determined threshold.

9. A method comprising:
recovering, via an interface receiver circuit in a first semiconductor die, decision outputs of a symbol de-mapper carried in an externally-generated signal, wherein the symbol de-mapper is external to the first semiconductor die, the externally-generated signal comprising a plurality of time stamps, each one of the plurality of time stamps corresponding to one of the decision outputs of the symbol de-mapper; and
recovering, via a demodulation circuit in the first semiconductor die, one or more datastreams based on the decision outputs of the symbol de-mapper.

10. The method of claim 9, further comprising combining, via circuitry of the first semiconductor die, a plurality of signals from a plurality of second semiconductor dice, each of the plurality of signals comprising decision outputs of a respective one of a plurality of symbol de-mappers that are external to the first semiconductor die.

11. The method of claim 10, wherein:
the first semiconductor die resides in a direct broadcast satellite (DBS) indoor unit; and
each of the plurality of second semiconductor dice resides in a respective one of a plurality of direct broadcast satellite (DBS) reception assemblies.

12. The method of claim 9, wherein the first semiconductor die resides in cable television customer premise equipment.

13. The method of claim 9, wherein the first semiconductor die resides in a baseband unit of a cellular basestation; and
each of the plurality of second semiconductor dice resides in a respective one of a plurality of remote radio units of a satellite basestation.

14. The method of claim 9, further comprising recovering, via the interface receiver circuit, equalizer settings carried in the externally generated signal.

15. The method of claim 9, wherein the decision outputs of the symbol de-mapper are formatted as log-likelihood ratios.

16. The method of claim 9, wherein the decision outputs of the symbol de-mapper are hard decision outputs when a corresponding signal-to-noise ratio is below a determined threshold and are soft decision outputs when the corresponding signal-to-noise ratio is above the determined threshold.

17. A semiconductor die comprising:
an interface receiver circuit operable to:
receive an externally-generated signal that carries decision outputs of a symbol de-mapper that is external to the first semiconductor die, the externally-generated signal comprising a plurality of time stamps, each one of the plurality of time stamps corresponding to one of the decision outputs of the symbol de-mapper, and process the externally-generated signal to recover the decision outputs of the symbol de-mapper carried in the externally-generated signal, wherein the decision outputs of the symbol de-mapper are selected to be one of a plurality of hard symbols and a plurality of soft symbols; and a demodulation circuit operable to recover one datastreams based on the decision outputs of the symbol de-mapper.

18. The semiconductor die of claim 17, wherein the demodulation circuit is further operable to recover timing of the externally-generated signal, equalize the externally-generated signal, and slice the externally-generated signal according to a determined symbol constellation.

19. The semiconductor die of claim 18, wherein the demodulation circuit is further operable to perform forward error correction decoding based on the decision outputs of the symbol de-mapper.

20. The semiconductor die of claim 17, wherein the semiconductor die is operable to select between outputting the plurality of hard decisions and the plurality of soft decisions based on characteristics of the externally-generated signal.

* * * * *

UNITED STATES PATENT AND TRADEMARK OFFICE
CERTIFICATE OF CORRECTION

PATENT NO. : 10,142,042 B2
APPLICATION NO. : 15/833305
DATED : November 27, 2018
INVENTOR(S) : Ling et al.

Page 1 of 1

It is certified that error appears in the above-identified patent and that said Letters Patent is hereby corrected as shown below:

In the Claims

In Column 13, Line 47, Claim 1, delete "one" and insert -- one or more --, therefor.

In Column 15, Line 10, Claim 17, delete "one" and insert -- one or more --, therefor.

Signed and Sealed this
Twenty-sixth Day of February, 2019

Andrei Iancu
*Director of the United States Patent and Trademark Office*